United States Patent [19]

Hornbaker, III et al.

[11] Patent Number: 5,144,448
[45] Date of Patent: Sep. 1, 1992

[54] SCANNING APPARATUS USING MULTIPLE CCD ARRAYS AND RELATED METHOD

[75] Inventors: Cecil V. Hornbaker, III, New Carrolton, Md.; Thomas C. Driggers, Falls Church; Edward W. Bindon, Fairfax, both of Va.

[73] Assignee: Vidar Systems Corporation, Herndon, Va.

[21] Appl. No.: 560,732

[22] Filed: Jul. 31, 1990

[51] Int. Cl.⁵ .............................................. H04N 3/14
[52] U.S. Cl. ................... 358/213.13; 358/482; 358/483
[58] Field of Search ................. 358/482–483, 358/213.11, 213.13

[56] References Cited

U.S. PATENT DOCUMENTS

| | | | |
|---|---|---|---|
| 3,962,681 | 6/1976 | Requa et al. | 340/146.3 H |
| 4,147,928 | 4/1979 | Crean et al. | 235/454 |
| 4,149,090 | 4/1979 | Agulnek | 250/566 |
| 4,149,091 | 4/1979 | Crean et al. | 250/566 |
| 4,356,513 | 10/1982 | Yoshimura et al. | 358/213 |
| 4,459,619 | 7/1974 | Yoshida | 358/482 |
| 4,465,939 | 8/1984 | Tamura | |
| 4,631,598 | 12/1986 | Burkhardt et al. | 358/280 |
| 4,692,812 | 9/1987 | Hirahara et al. | 358/483 |
| 4,734,787 | 3/1988 | Hayashi | 358/293 |
| 4,972,273 | 11/1990 | Burkhardt et al. | 358/443 |

FOREIGN PATENT DOCUMENTS

| | | |
|---|---|---|
| 57-13849 | 1/1982 | Japan. |
| 57-99080 | 6/1982 | Japan. |
| 58-97961 | 6/1983 | Japan. |
| 59-61269 | 4/1984 | Japan. |
| 59-67775 | 4/1984 | Japan. |
| 59-105762 | 6/1984 | Japan. |

*Primary Examiner*—Stephen Brinich
*Attorney, Agent, or Firm*—Finnegan, Henderson, Farabow, Garrett & Dunner

[57] ABSTRACT

A scanner apparatus using multiple CCD arrays for scanning an image line by line to produce data representative of the image can correct for misalignment of the arrays in the X-axis (scanning) direction and/or Y-axis (feed) direction using a combination of hardware, software, and firmware. To correct for alignment errors in the X-axis direction, the field of view of each of the arrays must overlap. A start pixel is determined for each array based on the degrees of overlap so that a composite scan line of data can be formed from the video image data from each of the arrays. The scan lines are continuously stored in a buffer memory which operates as a ring FIFO buffer. Alignment errors in the Y-axis direction are corrected by software in the host computer which reads separate portions of the scan lines from the buffer memory corresponding to each of the arrays using on read pointers that are set according to the alignment error. The scanner control firmware and software can measure the alignment of the arrays with a simple test target. In addition, the start pixel and read pointers can be changed while displaying the image on a CRT screen so that corrections can be made simultaneously to viewing the image.

27 Claims, 8 Drawing Sheets

SCANNING APPARATUS USING MULTIPLE CCD ARRAYS AND RELATED METHOD

BACKGROUND OF THE INVENTION

This invention relates to the field of raster input scanners, and more particularly to large-format raster input scanners employing more than one CCD array.

The imaging device in a document scanner is typically one of two types: (1) page-width CCD array; or (2) miniature CCD array. While page-width CCD arrays have certain advantages over miniature CCD arrays, they are expensive to manufacture in widths such as 36", which is necessary for handling large documents such as engineering or architectural drawings. Miniature CCD arrays, on the other hand, while cheaper than page-width CCD arrays, are generally not available in the widths needed for larger documents.

For example, 5000-element miniature CCD arrays are commonly available, but 5000 elements are usually not enough for a 36"-wide scanner. The minimum resolution considered adequate for most engineering imaging applications is 200 dots per inch (dpi). Thus, for a 36"-wide scanner, a minimum of 7200 elements (36 × 200) is required. Allowing for some margin at either end of the scanner, an array of at least 7500 elements is preferable.

Miniature CCD arrays having 7500 elements are now becoming available, but like page-width CCD arrays, they are expensive. Also, because such arrays are long (around 2.5"), the demands on the focusing system are more stringent, which further increases the cost. In addition, a 7500-element array is limited to 200 dpi for a 36"-wide scan, which is still not enough for some engineering applications.

One solution that has been proposed is to use two or more CCD arrays, such as 5000-element miniature CCD arrays. These smaller arrays have the advantages that they are cheaper, readily available, and do not require as expensive focusing systems.

In theory, the idea is simple: locate the arrays relative to one another so that they effectively behave like a single 10,000 element (or more) array. In practice, however, this can be difficult because of the fine mechanical adjustments that are necessary to align the arrays. An alignment of ±1 pixel element is equivalent to 7 microns at the array surface, or (assuming a 36"-wide scan) around 0.0004" at the imaging plane.

Alternatively, the image could be pieced together using software, taking the separate image data from each CCD array and then mapping the appropriate pixels from each separate image into a single image. This approach, while it could theoretically compensate for all of the misalignment errors of the CCD arrays, has the disadvantage that it requires both a large amount of data storage and a large amount of time.

SUMMARY OF THE INVENTION

Accordingly, it is an object of this invention to "fine-tune" the alignment of two or more CCD arrays using a combination of hardware, software, and firmware, in such a way that the arrays together behave like a single-solid state device. By electronically "stitching" the image data from two or more arrays together to achieve a single image, the invention also automatically takes care of effects of thermal drift and minor mechanical shock.

Additional objects and advantages of the invention will be set forth in part in the description which follows, and in part will be obvious from the description, or may be learned by practice of the invention. The objects and advantages of the invention will be realized and obtained by means of the elements and combinations particularly pointed out in the appended claims.

To achieve the objects of the invention, and in accordance with its purposes, as embodied and broadly described here, a scanner apparatus for scanning an image line by line to produce data representative of the image according to the invention comprises: a plurality of linear arrays, each of the arrays having a plurality of photosensitive pixel elements arranged in succession along a linear axis of the array; means for moving the image relative to the arrays; and means for supporting the arrays in position to scan the image with the linear axis of the arrays extending substantially perpendicular to the direction of movement of the image relative to the arrays.

In order to correct for misalignment of the arrays in the X-axis (or scanning direction) of the scanner, the scanner apparatus additionally comprises: means for determining a starting pixel element for each array; means for reading video image data from each of the arrays beginning at the starting pixel element for each array and ending a predetermined number of pixel elements after the starting pixel element; and means for forming a composite scan line of data representative of a single line of the image from the video image data read from each of the arrays. Further in accordance with the invention, each array preferably has a field of view that is less than the width of the image and the field of view of each array overlaps with the field of view of one of the other arrays, and the means for determining the starting pixel element includes means for determining an error value corresponding to the degree of overlap between the arrays.

Likewise correct for misalignment of the arrays in the Y-axis (or feed direction) of the scanner, the scanner apparatus additionally comprises: memory buffer means for storing the scan lines of data in sequential memory location; means for determining in a host computer starting read pointers corresponding to each array for reading from the memory buffer means separate portions of the scan lines of data corresponding to the video image data read from each of the arrays; and means for reading from the memory buffer means the separate portions of the scan lines of data to form a composite scan line of data representative of a single line of the image.

In addition, in order to correct for misalignment errors while simultaneously viewing the scanned image, the scanner apparatus further comprises: means for displaying by the host computer the composite scan lines of data representative of the image on a display device while the image is being scanned; and means for changing the starting read pointers corresponding to each array while the image is being scanned.

In the scanner apparatus according to the invention as just described, there is also provided a related method of forming a composite scan line of data representative of a single line of the image. The method which corrects for misalignment of the arrays in the X-axis direction specifically comprises the steps of: determining a starting pixel element for each array; reading video image data from each of the arrays beginning at the starting pixel element for each array and ending a predetermined number of pixel elements after the starting pixel element; and forming the composite scan line of data from the video image data read from each of the arrays. The step of determining the starting pixel preferably includes the substep of determining an error value corresponding to the degree of overlap between the arrays.

Similarly, the method which corrects for alignment errors of the arrays in the Y-axis direction comprises the additional steps of: storing the scan lines of data in sequential memory locations in a memory buffer; determining in a host computer starting read pointers corresponding to each array for reading from the memory buffer separate portions of the scan lines of data corresponding to the video image data read from each of the arrays; and reading from the memory buffer means the separate portions of the scan lines of data to form the composite scan line of data.

To correct the misalignment errors while viewing the image, the method includes the further steps of: displaying by the host computer the composite scan lines of data representative of the image on a display device while the image is being scanned; and either changing the starting pixel element for each array while the image is being scanned, or changing the starting read pointers corresponding to each array while the image is being scanned.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

DESCRIPTION OF THE PREFERRED EMBODIMENT

Reference will now be made in detail to the presently preferred embodiment of the invention, an example of which is illustrated in the accompanying drawings.

In the preferred embodiment of the invention, two 5000-element linear CCD arrays are used to image a 36" line with a resolution of 270 dpi. Each linear CCD array may be, for example, an NEC-3571 array, which is a commercially-available 5000-element CCD array.

Typically, CCD arrays have no external reference to locate the photosites within the package. Thus, the usual practice is to use a microscope to locate the photosites and then position the entire package within some sort of holder. Alternatively, once the CCD array has been mounted on a circuit board and the board is clamped to a camera for focusing the image on the photosites, the entire assembly can be moved around in order to position the CCD arrays relative to one another.

The CCD arrays used in the preferred embodiment of the invention, such as the NEC-3571 previously mentioned, preferably have an external reference mark which locates the photosites relative to the CCD array package. By having an external reference to the photosites, the CCD array package can be accurately mounted on a fixture for mounting in the scanner. The fixture including the CCD array package can be mounted easily in the scanner using conventional methods.

Using this technique, the CCD arrays are mounted in such a way that they are parallel to the X-axis (or scanning direction) of the scanner. Other manufacturing techniques may be used, but for purposes of the invention, it is assumed that the CCD arrays are mounted to achieve acceptable parallelism or may be mechanically adjusted to achieve such parallelism. In practice, this is relatively easy to achieve.

Figure 1:
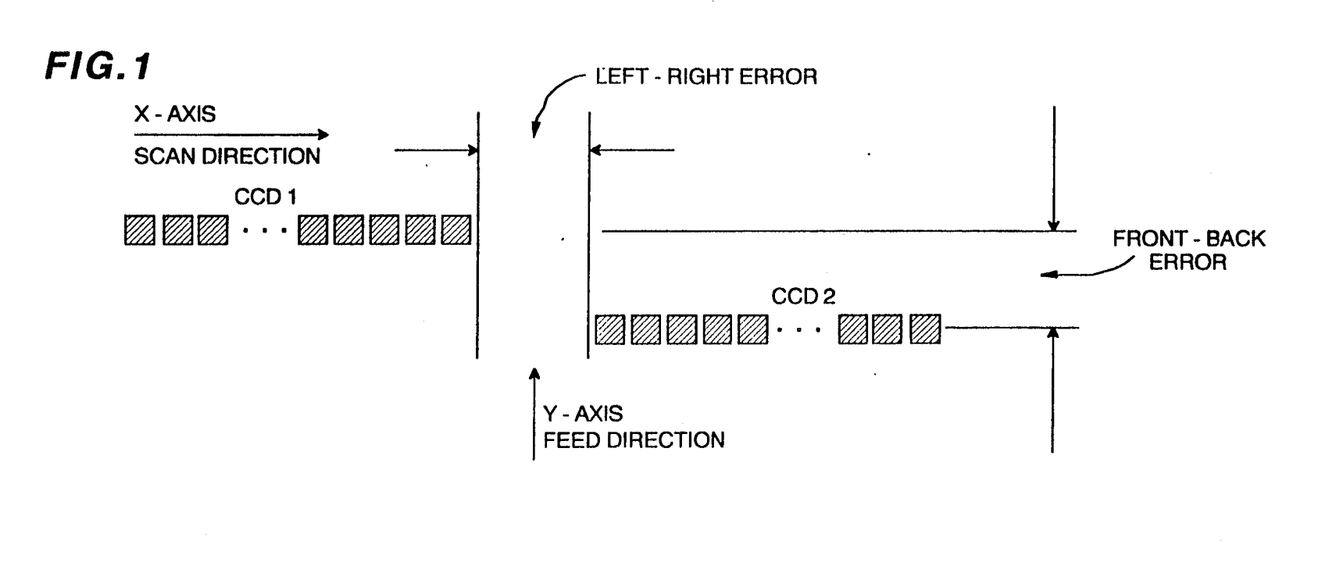
FIG. 1 is diagram illustrating right-left (X-axis) and front-back (Y-axis) alignment errors between two CCD arrays.

The two types of errors in misalignment that still must be corrected are left-right error in the direction of the X-axis and front-back error in the direction of the Y-axis (or feed direction). As shown in FIG. 1, the pixel image data from each of the two CCD arrays may be misaligned both left-to-right and front-to-back, requiring adjustment in both directions to produce a correctly "stitched" image. Each of these types of errors is dealt with separately below.

Left-Right (X-Axis) Stitch

In order to "stitch" the images from two or more CCD arrays, the image data from the CCD arrays must be arranged so that the last image pixel of one CCD array is adjacent to the first image pixel of the next CCD array. In physical terms, this is analogous to moving one of the CCD arrays to the right or left and is referred to as left-right (or X-axis) stitch.

Figure 2:
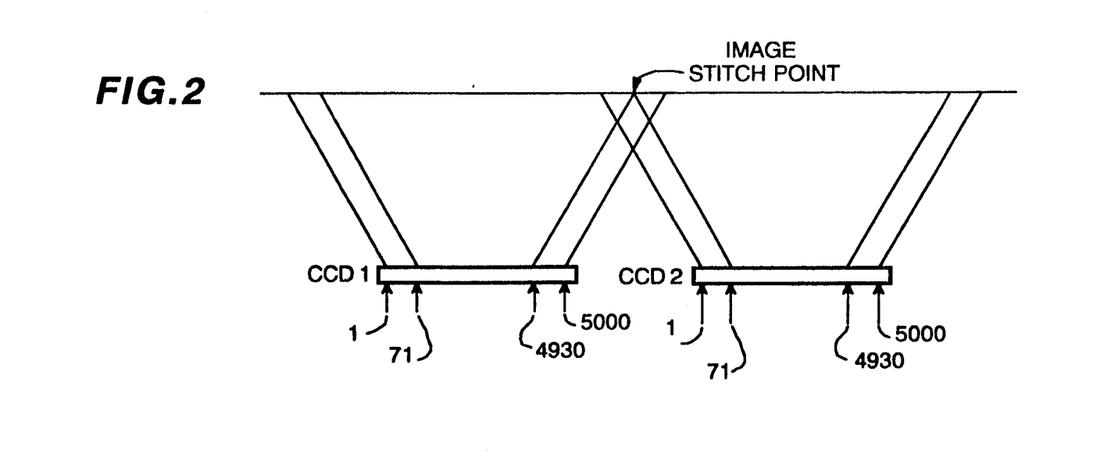
FIG. 2 is a diagram illustrating overlap and left-right stitch between two CCD arrays.

To adjust for errors in the X-axis direction, the fields of view of adjacent CCD arrays must overlap to some extent in the image plane as shown in FIG. 2. Thus, some number of pixels from the image data from each CCD array are reserved for stitching purposes. This number of pixels must be sufficient to deal with worst-case manufacturing tolerances, i.e., the largest amount of overlap or separation that can occur.

For example, to image a 36" line at a resolution of 270 dpi, only 4860 pixels are needed from each of two CCD arrays. Using two 5000-element CCD arrays leaves 140 pixels from each CCD array available for left-right stitch. The mechanical design of the scanner may be such that the CCD arrays nominally will have a 70 pixel left-right overlap in the X-axis at the stitch point. If the scanner is mechanically perfect, scanning using pixels 71–4930 of each CCD array (i.e., 4860 pixels starting from pixel 71) will produce a properly stitched image. The first and last 70 pixels of each CCD array (i.e., pixels 1–70 and 4931–5000) will be unused.

If the scanner is not mechanically perfect, and the CCD arrays are too close together, the pixel image data from the two CCD arrays will overlap at the stitch point. By adjusting the start pixel for each CCD array, the image data overlap can be eliminated. For example, if the image data overlapped by 10 pixels, the overlap could be eliminated by taking the image data pixels from CCD array 1 starting at pixel 66 and taking the image data pixels from CCD array 2 starting at 76. Similarly, if the CCD arrays are three pixels too far apart, the separation could be eliminated by taking the image data pixels from CCD array 1 starting at pixel 72 and taking the image data pixels from CCD array 2 starting at pixel 69.

To generalize the left-right stitch conditions and adjustments, the degree of overlap may be used as the measure of left-right stitch error (LRSE). Thus, left-right separation may be thought of simply as negative overlap. For the first example above, the LRSE would be 10, and for the second example, the LRSE would be −3.

The left-right stitch adjustment for CCD array 1 (LRSA1) can be expressed as follows:

$$LRSA1 = -LRSE/2$$

Likewise, the left-right stitch adjustment for CCD array 2 can be expressed as follows:

$$LRSA2 = LRSE - LRSA1$$

Each of these adjustments (LRSA1 and LRSA2) are added to the nominal starting pixel of each CCD array in order to determine the actual starting pixel. Thus, in the previous examples, the actual starting pixel for CCD array 1 will be 71 + LRSA1 and the actual starting pixel for CCD array 2 will be 71 + LRSA2.

Front-Back (Y-Axis) Stitch

In addition to stitching the images from two CCD arrays left-to-right, the image data from the CCD arrays must be arranged so that the image lines from each CCD array are also co-linear. In physical terms, this is analogous to moving one of the CCD arrays forward or backward relative to the other CCD array and is referred to as front-back (or Y-axis) stitch.

In a line scanner, the document image is produced by imaging a line one pixel high, moving the document one pixel height forward, and repeating the process until the entire document has been imaged. If the two (or more) CCD arrays were perfectly aligned in the Y-axis, a line on the document running parallel to the X-axis would be imaged by both CCD arrays at the same time. If the CCD arrays are not aligned in the Y-axis, then one CCD array will image the line earlier than the other. This Y-axis or front-back stitch error can be eliminated by delaying (or advancing) the image data from one CCD array relative to the other CCD array.

In the preferred embodiment of the invention, front-back stitch error is corrected by means of a random access memory (RAM) organized as a ring FIFO (first-in first-out) buffer. Each line of X-axis pixel data is written continuously into a multiple-line memory starting at the first memory location and wrapping back around to the beginning when the memory is full. When more lines than the front-back stitch error have been stored in the memory, the image data can be read out of the memory one half scan line at a time using separate read pointers for the right and left halves of the scan line.

Figure 3:
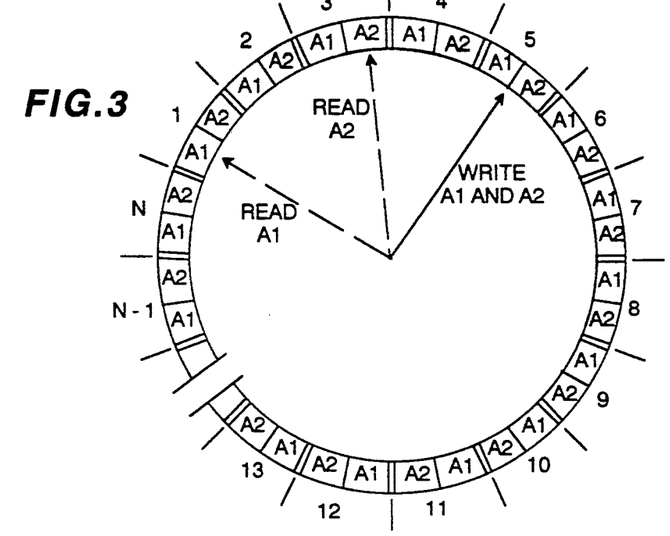
FIG. 3 is a block diagram illustrating use of a ring FIFO buffer to advance or delay the image data from the two CCD arrays.

FIG. 3 illustrates this concept of using a ring FIFO buffer to advance or delay the image data from two CCD arrays. Each number 1 through N represents a block of memory equal in size to one complete scan line. The left half of each scan line, which is received from the first CCD array, is stored in one of the blocks of memory labelled A1. Likewise, the right half of each scan line, which is received from the second CCD array, is stored in one of the blocks of memory labelled A2. The arrows in FIG. 3 represent a write pointer and two read pointers for writing and reading scan lines to and from the ring FIFO buffer.

A typical case of front-back misalignment such as illustrated in FIG. 3, might be for CCD array 1 to be mounted in the scanner at such a point that its image line is two lines ahead of CCD array 2. As soon as three lines have been written into the memory blocks 1–3, the first image scan line can be assembled by reading the first half (A1) of block 1 containing pixel image data from CCD array 1 for the left half of the scan line, and by reading the second half (A2) of block 3 containing pixel image data from CCD array 2 for the right half of the scan line. Scan lines may continue to be written into the memory as shown in FIG. 3 with the next scan line being written into block 5 as indicated by the write pointer.

As with the left-right stitch, certain terms can be used to generalize the front-back stitch. If the number of bytes for a scan line (i.e., the total number of bytes in one of the memory blocks in FIG. 3) is denoted as SBW, and the front-back stitch error (FBSE) has a positive value if image data from CCD array 1 is ahead of the image data from CCD array 2, then the front-back offset for CCD array 1 (C1FBSO) and CCD array 2 (C2FBSO) can be expressed as follows:

```
IF FBSE > 0 THEN:
    C1FBSO = 0
    C2FBSO = FBSE * SBW
ELSE:
    C1FBSO = -FBSE * SBW
    C2FBSO = 0
```

These offsets (C1FBSO and C2FBSO) are added to the normal data pointers for reading data from each CCD array assuming no front-back stitch error.

Alternatively, the data for each half of the scan line could be written to a different block of memory depending on the front-back stitch error. A single scan line could then be read from each block.

The total correctable error in the Y-axis direction is determined by the number of scan lines that may be stored in the memory. For example, a 36" document scanned at 300 dpi requires a minimum of 1350 bytes per line to store binary image data. Allowing some additional bytes for packing at the beginning and end of each scan line, a 64K-byte memory can hold approximately 45 scan lines. This is generally more than enough to correct for front-back stitch errors and also allows the memory to be used as a data buffer between the scanner and a host computer.

Scanner Apparatus Hardware

Figure 4:
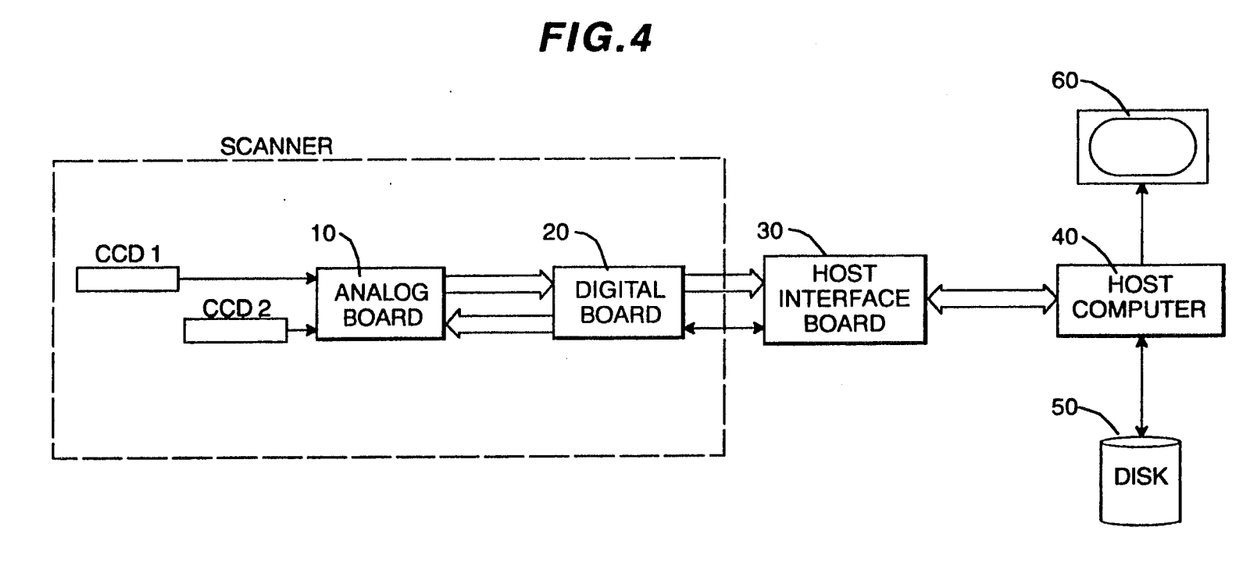
FIG. 4 is a schematic block diagram of the scanner hardware apparatus of the preferred embodiment for producing a single scanned image from two CCD arrays.

In the preferred embodiment of the invention as illustrated in the block diagram of FIG. 4, the hardware components for producing the scanned image from the CCD arrays are divided into four parts: (1) an analog board 10; (2) a digital board 20; (3) a host interface board 30; and (4) a host computer 40.

The analog board 10 and the digital board 20 are preferably located in the scanner apparatus along with the two (or more) CCD arrays, shown in FIG. 4 as CCD 1 and CCD 2. The analog board 10 receives analog video signals from CCD 1 and CCD 2 under control of the digital board 20 and converts the analog data into 6-bit grey scale digital data. The digital board 20, which includes a programmed microprocessor, receives the converted grey scale data from the analog board 10, performs the left-right stitch on the data under firmware control to produce scan lines, and optionally adjusts the resolution of the data.

The host interface board 30, which may be physically located in the host computer 40, receives the scan lines of grey scale data from the digital board, thresholds and packs the data into 8-bit bytes of binary image data, and stores the binary image data in a random access memory (RAM) buffer for reading by the host computer 40. The host computer 40, which may be a personal computer such as an IBM PC-AT, reads the image data from the RAM buffer on the host interface board 30 under appropriate scanner system software control, using separate read pointers to correct for front-back stitch errors. The host computer 40 may then store the stitched image data onto a disk 50, which may be an optical or a magnetic disk system, or display the data on a CRT screen 60.

Each of these parts of the scanner apparatus hardware is described in further detail below.

Analog Board

Figure 5:
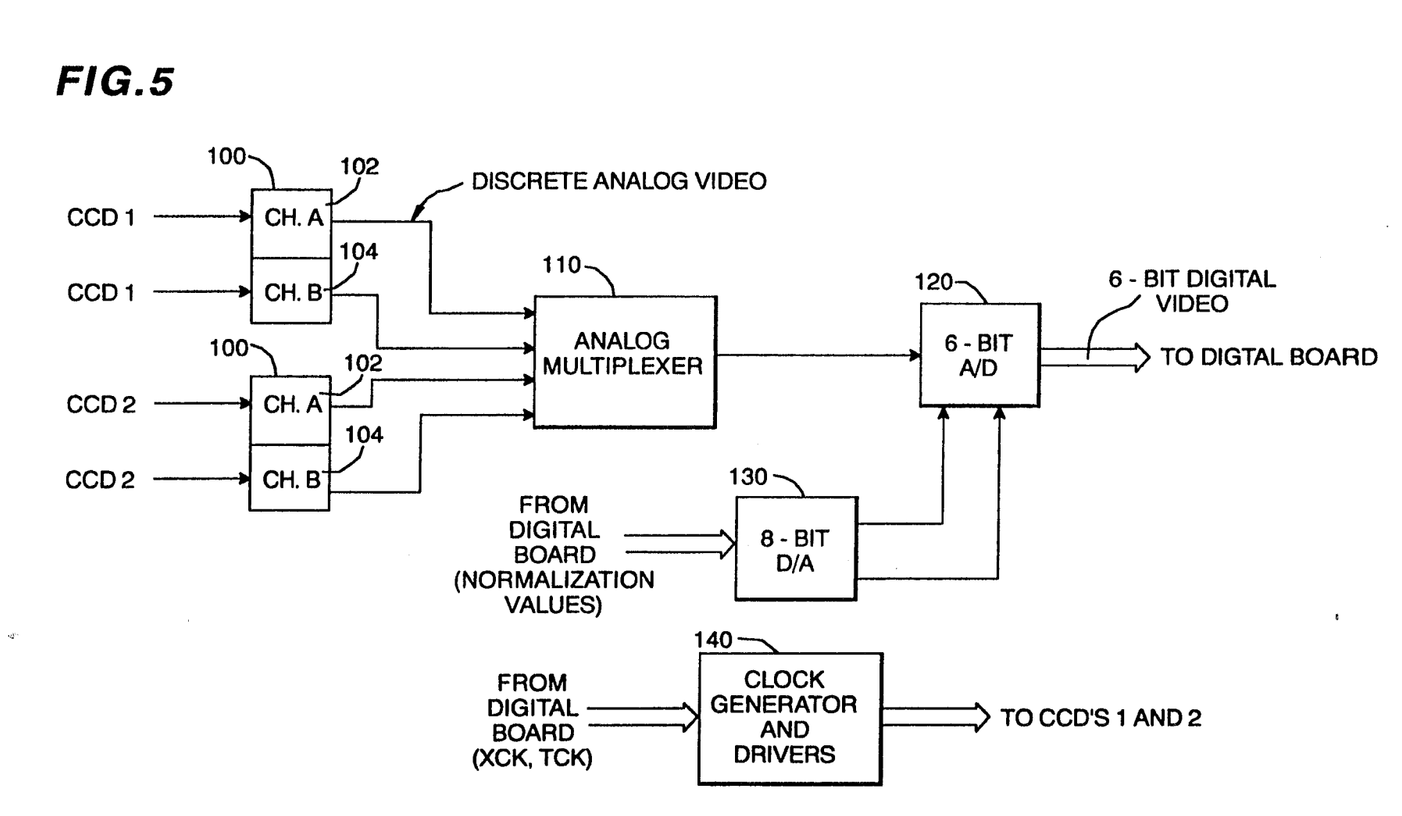
FIG. 5 is a schematic block diagram of an analog board portion of the scanner hardware apparatus according to the preferred embodiment.

FIG. 5 is schematic block diagram of the analog board 10 shown in FIG. 4. The analog board 10 receives the analog video signals from the CCD arrays and converts the signals to 6-bit grey scale digital data under control of the digital board 20. In addition, the analog board 10 supplies high voltage clock signals to operate the CCD arrays.

Each CCD array generally requires certain high voltage clock signals for proper operation. For example, a CCD array such as the NEC-3571 requires clock signals having 0 to 12 volt swings for operation. Thus, analog board 10 includes a clock generator and driver circuit 140 for producing the proper clock signals to the CCD arrays based on clock signals from the digital board 20.

The digital board 20 provides two types of clock signals to the analog board 10 for controlling the CCD arrays. One is a transfer clock signal (XCK) which transfers the image information from the photosites of the CCDs to the shift register on the CCD array. A second is a transport clock signal (TCK) which transports the video image data out of the shift register of the CCD array.

A 5000-element CCD array typically has more pixels than the 5000 active elements on the array. The additional elements include several "dark-reference" pixel elements located at the beginning of the array. These elements are identical to the normal photosensitive elements, but are covered with a metal mask making them insensitive to light. Thus, these elements produce an output voltage that is representative of the voltage for a black (dark) pixel.

This dark reference voltage may be used to remove the DC bias of each CCD array. The output of the CCD array is a negative going level of approximately 0.75 volts with a positive bias of approximately 6 volts which must be removed prior to conversion of the signal. The digital board 20 must issue an appropriate number of transport clocks (TCK) to each CCD array in order to reach the dark-reference pixels in each. When the reference voltages of the dark pixels have been shifted into the output stage of each array, sample and hold circuits 102 and 104 in input buffers 100 store the output reference voltages from the CCD arrays. The reference voltages stored in the input buffers 100 may then be used to remove the DC bias before converting the analog video input signals to grey scale digital data.

As shown in FIG. 5, the analog board 10 actually receives two analog video input signals from each CCD array. CCD arrays typically have two outputs for even and odd pixel data. The odd and even video outputs are valid for a full cycle of the transport clock (TCK), but one output typically changes on the rising edge of the clock, while the other changes on the falling edge.

An analog multiplexer 110 is therefore used to select from the four video input signals for input to analog-to-digital (A/D) converter 120. The A/D converter 120 may be, for example, a 6-bit parallel-type flash converter. The digital output of the converter is proportional to the analog voltage level at the input and the voltage levels on the top and bottom of the internal resistor ladder. If the lower end of the ladder is raised above zero, then any input voltage below that value will produce a digital zero output. Setting this lower level of the A/D converter 120 can therefore be used to adjust the bias of the video input data. Likewise, the voltage level on the top end of the ladder sets the input voltage level which will produce a full scale (all ones) output. This allows each pixel in the array to be normalized to a common value by supplying a different upper reference value for each pixel.

The top and bottom levels of the A/D converter 120 are provided by a dual eight-bit digital-to-analog (D/A) converter 130. The lower level is preferably set once by data received from the digital board 20, and the upper level changes pixel by pixel as will be further explained in connection with the digital board.

Digital Board

Figure 6:
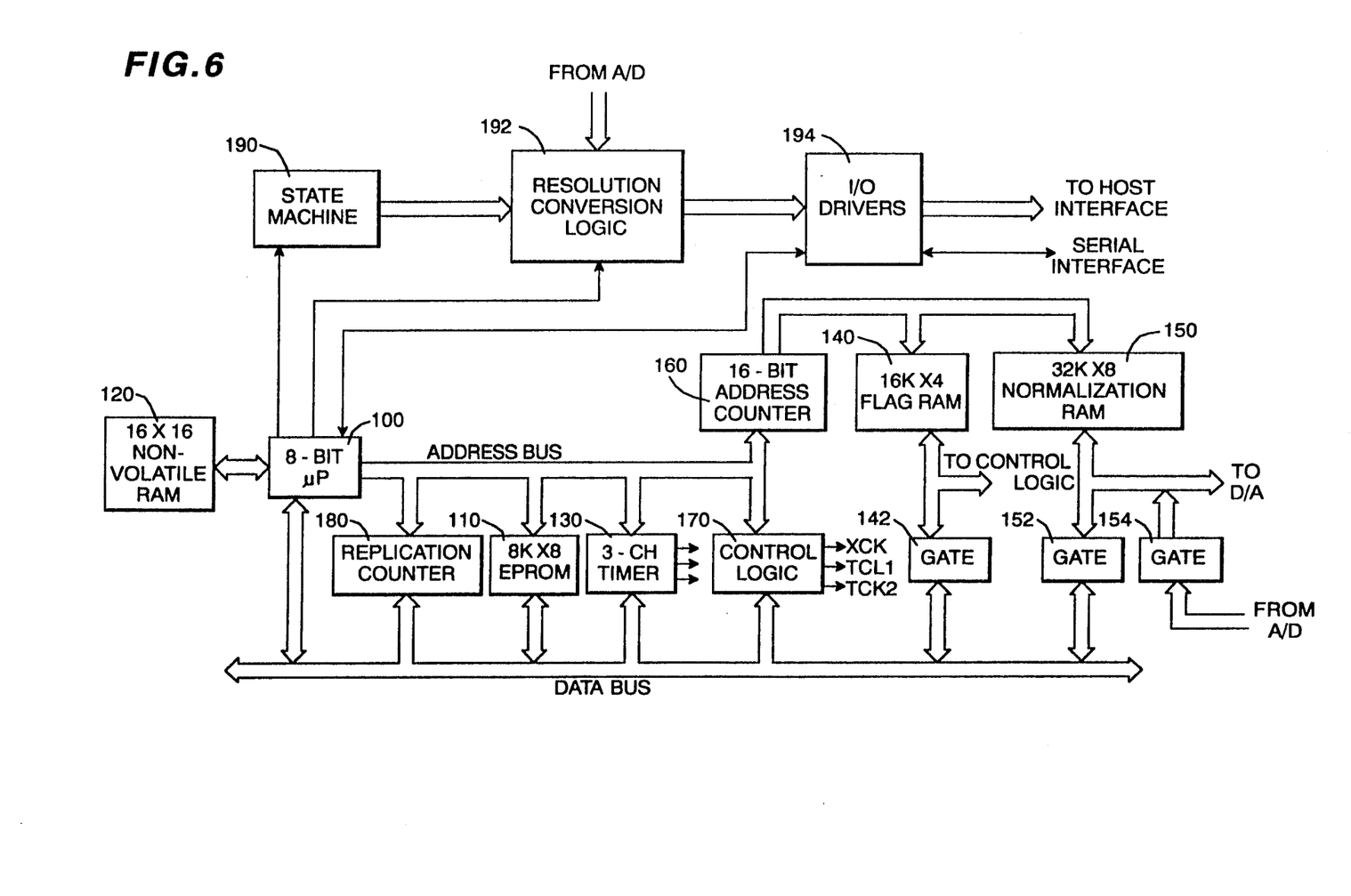
FIG. 6 is a schematic block diagram of a digital board portion of the scanner hardware apparatus according to the preferred embodiment.

FIG. 6 is schematic block diagram of digital board 20. Digital board 20, which includes a programmed microprocessor 100, receives the converted grey scale pixel data from the A/D converter 120 on analog board 10, performs the left-right stitch on the data under firmware control to produce scan lines, and adjusts the resolution of the data.

Microprocessor 100 is preferably an 8-bit microprocessor having an address bus, a data bus, and several external ports as shown in FIG. 6. A firmware program for controlling the various functions of the digital board 20 is stored in erasable programmable memory (EPROM) 110. EPROM 110 may be, for example, an 8K by 8-bit memory, which is generally sufficient for the firmware necessary to operate the digital board 20.

In addition, the digital board 20 preferably includes a 16 × 16 nonvolatile RAM 120 for storing values such as the left-right stitch error (LRSE), the front-back stitch error (FBSE), and the scanner motor speed. Also included on the digital board is a programmable 3-channel timer 130 which may be directly loaded by the microprocessor 100. The programmable timer 130 may be used to produce step pulses to the roller stepper motor for feeding the document through the scanner. The timer is also used as the line integration timer for controlling the exposure time for each line. In general, the microprocessor 100 programs the timer 130 in a free-running square wave mode during a scan. External control logic may also be used to gate the step pulses on or off to stop or pause the scan.

The digital board 20 has two additional memories, flag RAM 140 and normalization RAM 150, which contain control flag values and normalization values, respectively, for use during a line scan. A 16-bit address counter 160 generates addresses to both memories 150 and 160 during a scan, or the microprocessor 100 may address the memories directly by inhibiting the counter 160 and allowing the address bus to bypass or pass through the counter. When the microprocessor 100 addresses the memories directly through the address bus, the microprocessor data bus is connected to memories 140 and 150 through data transmission gates 142 and 152, respectively. During a line scan, the 16-bit address counter 160 supplies the memory addresses by counting sequentially and the microprocessor data bus is disconnected from the memories 140 and 150.

The normalization RAM 150 is preferably a 32K by 8-bit RAM which is used as if it were two 16K by 8-bit memories. The lower 16K bytes of the normalization RAM 150 contain the normalization values. During a scan, these values are sequentially output to the D/A converter 130 on the analog board 10 to allow each pixel to be normalized to a common value.

The upper 16K bytes of normalization RAM 150 receives through transmission gate 154 the unprocessed grey scale pixel data from the A/D converter 120 on the analog board 10. This raw grey scale data may be used by the microprocessor 100 under firmware control for diagnostic routines and to calculate the normalization values and left-right stitch error. For example, the scanner may first scan a white reference target to obtain reference grey scale data. This reference data can then be used to adjust the gain of individual elements of the CCD arrays by calculating appropriate normalization values for storage in the lower 16K bytes of the normalization RAM 150 and output to the D/A converter 130 on the analog board 10.

In order to effectively split memory 150 into two 16K-byte memories for performing both functions, the read and write signals may be timed to occur in separate portions of the same clock cycle.

The flag RAM 140 is a 16K by 4 bit memory for controlling the sequencing of data from the CCD arrays during a line scan. The function of each bit of the flag RAM 140 is assigned as follows:
Bit 0—enable transport clock (TCK1) to CCD 1
Bit 1—enable transport clock (TCK2) to CCD 2
Bit 2—stop scan
Bit 3—enable data to the host computer The first phase of a scan operation, CCD initialization, is under direct firmware control. For example, the microprocessor 100 executing a firmware program stored in EPROM 110, will first issue a transfer clock (XCK) to each CCD array. This clock signal and the other clock signals (TCK1, TCK2) may be generated by special control logic 170 which is directly accessed by the microprocessor 100 under firmware control. The actual clock signals to the CCD arrays are driven by the clock generator and driver circuit 140 on the analog board 10. The firmware program then issues an appropriate number of transport clock pulses (TCK1, TCK2) to each CCD array to reach the "dark" pixels. The firmware program will then count up to the start pixel of each CCD array based on the calculations described above using the left-right stitch error (LRSE) stored in the nonvolatile RAM 120.

From that point, the hardware takes over with the address counter 160 causing both the flag RAM 140 and the normalization RAM 150 to send appropriate control signals to the analog board 10, and thus the CCD arrays, to cause the video image data to be read out of the two CCD arrays. For example, bit 0 in the flag RAM 140 will be set for the first 4860 memory locations corresponding to the 4860 pixels to be used from CCD array 1. This will cause 4860 transport clocks (TCK1) to be issued to CCD array 1 causing that number of pixels to be read out of the CCD array. Likewise, in the next 4860 memory locations of the flag RAM 140, bit 1 will be set to cause 4860 pixels to be read out of CCD array 2. After that, bit 2 will be set to cause the scan operation to stop and return to firmware control. Bit 3 of the flag RAM is used to enable a data strobe of the output data to the host interface board 30.

In addition, the digital board 20 has several other features for controlling the resolution of the scanned image data. In the preferred embodiment of the invention, using two 5000-element CCD arrays to scan a 36" document, the resolution achieved is 270 dpi. Other resolutions such as 150 or 200 dpi may be needed, however, as well as 300 dpi in some cases.

In order to achieve a pseudo-resolution of 300 dpi, digital board 20 includes a replication counter 180. Replication counter is a free running decade counter that may be directly initialized by the microprocessor 100 through the data bus. Every ninth clock, the resolution counter 180 produces a control signal which pauses the address counter 160 and inhibits the transport clocks (TCK1, TCK2) to the CCD arrays. Thus, every ninth pixel from the CCD arrays is repeated, effectively producing a pseudo-resolution of 300 dpi. In order to ensure that a replicated pixel does not occur at the stitch point between the CCD arrays, the replication counter 180 can be preloaded at the beginning of each scan line.

In addition to the replication counter 180, the digital board 20 also includes state machine 190 an resolution conversion logic 192 for converting the resolution of the data down from 300 dpi to, for example, 150 or 200 dpi. Lower resolution pixel data can be obtained by adding appropriately weighted consecutive pixels. In order to simplify the hardware, it is easier to add whole pixel values and normalize the resulting sum. For example, to convert input data at 300 dpi to 200 dpi, rather than add 2/3A + ⅓B, the first value (A) may be multiplied by two and added to the next value (B) ad then the sum may be multiplied by ⅓ using a look-up table.

The microprocessor 100 provides a control signal to the state machine 190 indicating the desired resolution.

The state machine 190 contains control logic for controlling the various functions of the resolution conversion logic 192 such as adders and look-up tables. The resolution conversion logic 192 receives the 6-bit grey scale data from A/D converter 120 on the analog board 10 and converts it to the selected resolution. The output data at the selected resolution from the resolution conversion logic 192 is then output from the digital board 20 to the host interface board 30 by input/output (I/O) drivers 194. The I/O drivers also provide a strobe signal to the host interface board 40 to indicate when the pixel data is valid as determined by bit 3 in the flag RAM 140.

I/O drivers 194 also send and receive bi-directional asynchronous communication signals over a serial interface to the host interface board 30. The microprocessor 100 has a built-in universal asynchronous receiver and transmitter (UART) for communicating with the host computer 40.

Host Interface Board

Figure 7:
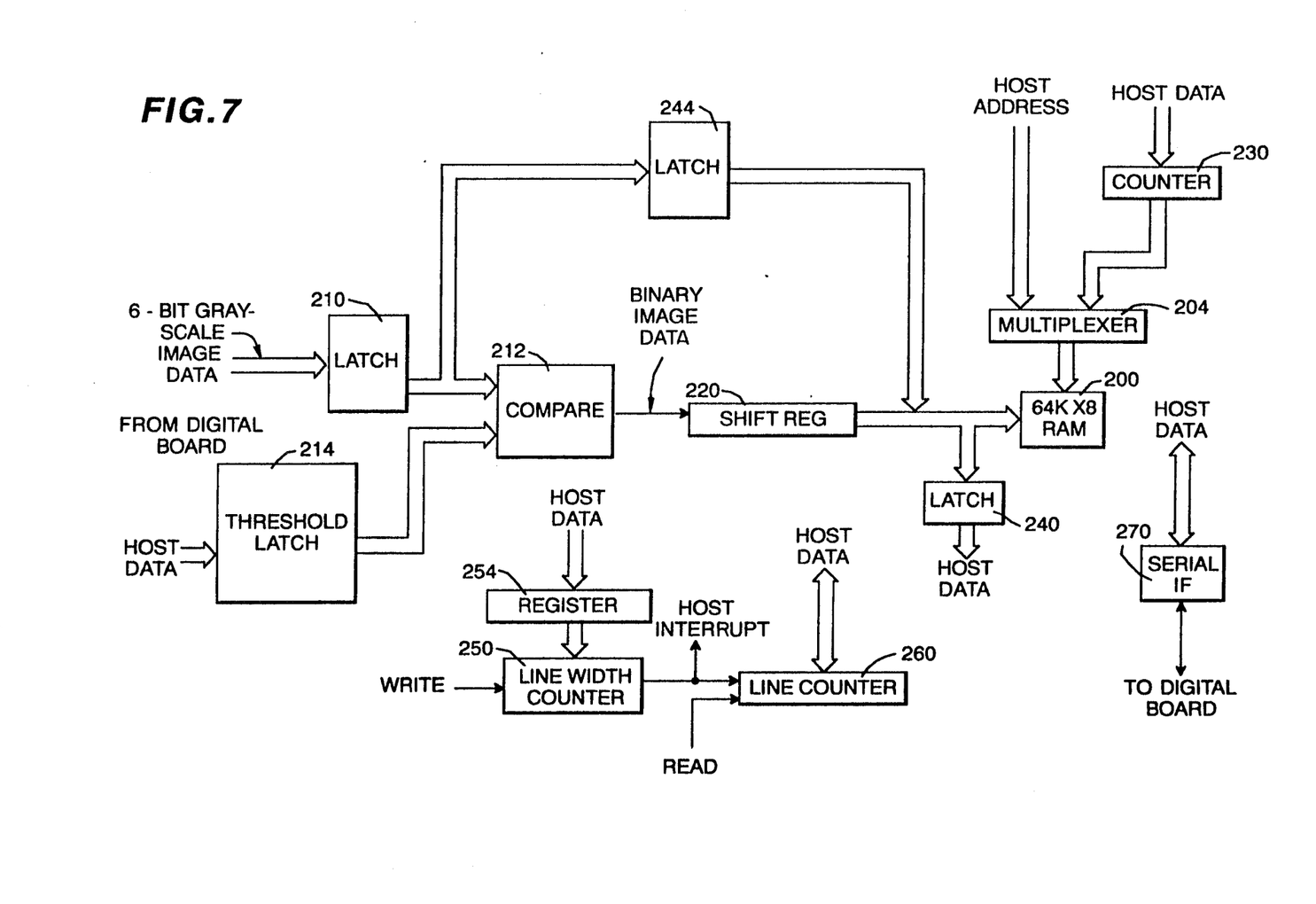
FIG. 7 is a schematic block diagram of a host interface board portion of the scanner hardware apparatus according to the preferred embodiment.

FIG. 7 is schematic block diagram of the host interface board 40 shown in FIG. 4. The host interface board 30 may be physically located in the host computer 40. The host interface board 30 receives the scan lines of grey scale data from the digital board, thresholds and packs the data into 8-bit bytes of binary image data, and stores the binary image data in a random access memory (RAM) buffer for reading by the host computer 40.

The 6-bit grey scale pixel data output from the I/O drivers 194 of digital board 20, is received by the host interface board and latched in a latch circuit 210. The strobe signal which is output from the digital board 20 with the pixel data may be used to latch the pixel data into the latch circuit 210.

The grey scale pixel data may be compared to a preset threshold value in order to convert it to a binary image. Thus, the host computer 40 will preset a threshold value in the threshold latch 214. This value is then compared to the grey scale pixel data held in latch 210 by comparator 212. If the pixel grey scale value exceeds the threshold, then the output of the comparator 212 is set to a binary "1" to represent that the pixel is turned on.

The binary pixel data from the comparator 212 is shifted into an 8-bit shift register 220 in order to pack the single binary bits into 8-bit bytes. It may also be necessary to include some additional bits as padding into the first byte of each scan line so that the stitch point between the CCD arrays falls on a byte boundary.

The host interface board 30 includes a 64K by 8-bit RAM 200 which is used as a ring FIFO buffer for storing the binary image data. As each 8-bit byte is formed in the shift register 220, it is stored in the buffer memory 200 in consecutive locations of the memory. A counter 230 provides sequential addresses to the memory locations through multiplexer 204. The counter 230 may be preset by data from the host computer 40 and is incremented each time a byte is written into the buffer memory 200, wrapping around to the first memory location when the memory is full.

The binary image data is written into the buffer memory 200 continuously as it is received from the digital board 20. Thus, in the preferred embodiment, the data is written into the memory regardless of the beginning and end of scan lines. It is therefore up to the host computer 40, when reading the image data from the buffer memory 200, to keep track of the scan lines.

As shown in FIG. 7, the buffer memory 200 may be accessed directly by the host computer 40 by providing a host address through multiplexer 204. Data is read out to the host computer 40 through latch 240. Since data obviously cannot be written into and read out of the memory simultaneously, some type of priority control logic or time multiplexing of the memory is necessary.

In addition, the grey scale pixel data received from the digital board 30 may be stored directly in the buffer memory 200 through latch 244 without thresholding the data or packing it into 8-bit bytes. Of course, the image data will be eight times as large as the binary image just described, meaning that the buffer memory will be able to hold only one-eighth of the number of scan lines of the binary image.

In order to keep track of the scan lines written into the buffer memory 200, the host interface board 30 includes a line width counter 250 and a line counter 260. Before each scan, the host computer 40 first preloads a register 245 with a two's complement value corresponding to the number of pixels in each scan line. At the beginning of each scan line, the value stored in register 254 is loaded into the line width counter 250. As each byte of data is written into the buffer memory 200, the line width counter 250 is incremented. When the counter 250 overflows, based on the value that was preloaded from the register 254, the end of a scan line has been reached. The overflow signal from the counter 250 is used to send an interrupt signal to the host computer 40 to indicate that a scan line has been received in the buffer memory 200. The value in register 254 is then automatically reloaded into the line width counter 250 for the next scan line.

In addition, the overflow signal from the line width counter 250 indicating the end of a scan line is also used to increment the line counter 260. Line counter 260 is used to keep track of the number of scan lines that are stored in the buffer memory 200 Thus, each time the host computer 40 reads a scan line out of the buffer memory 200, the line counter 250 is decremented. The host computer 40 may also directly access the line counter in order to preset the line counter at the beginning of a scan and to periodically determine how many scan lines are stored in the buffer memory 200 to prevent the buffer memory from overflowing.

In addition, the host interface board 30 includes a serial interface 270 between the host computer 40 and the microprocessor 100 on the digital board 30.

Host Computer Software and Microprocessor Firmware

In the scanner hardware apparatus just described, two levels of programming are required in order to scan a document. The host computer 40 operates under system software control to initialize a scan operation and to read scan lines from the buffer memory 200 on the host interface board 30. Thus, the host computer software, through separate read pointers to locations in the buffer memory, can correct for front-back stitch error as described above. Likewise, microprocessor 100 on digital board 20 requires a firmware program stored in EPROM 110 in order to produce scan lines of image data and to correct for left-right stitch error.

Figure 8A:
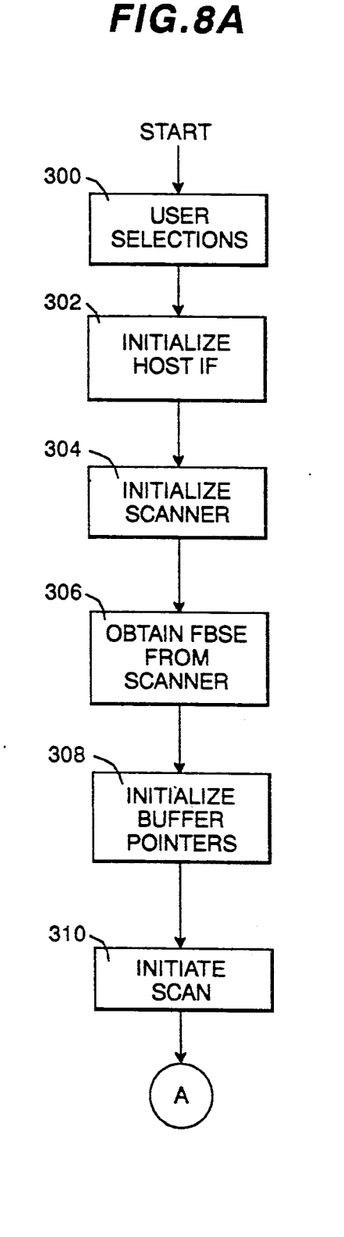
FIGS. 8A and 8B are flow diagrams of the steps performed by the scanner system software in the host computer for producing a single scanned image from two CCD arrays.
Figure 8B:
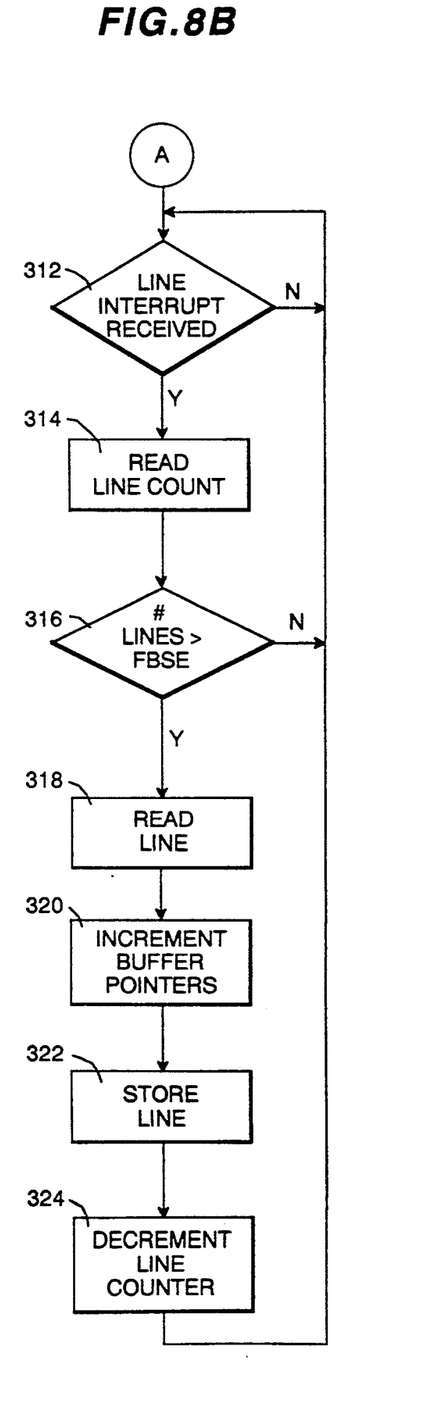

FIGS. 8A and 8B are flow diagrams of the steps performed by the host computer 40 in order to scan a document. Steps 300–310 shown in FIG. 8A are the steps for initializing a scan, and steps 312–324 in FIG. 8B are the steps for reading and storing each scan line in response to a line interrupt from the host interface board 30.

In the first step 300 of FIG. 8A, the host computer receives input selections from the user regarding the scan to be performed, such as the size of the document, the resolution to be used, and a threshold value. Using these values, in step 302, the host computer initializes the host interface board 30. Specifically, the host computer loads the line width counter 250 based on the document size and the resolution, resets the other counters such as the address counter 230 and line counter 260, and loads the selected threshold value into the threshold latch 214.

In step 304, the host computer initializes the scanner through the serial interface to the microprocessor 100 on the digital board 20. Specifically, the host computer sends information regarding the document width and the resolution to the microprocessor. In return, the microprocessor sends the front-back stitch error (FBSE), which is stored in the nonvolatile RAM 120 on the digital board 20, back to the host computer for use in setting up the read pointers to the buffer memory.

Thus, in step 308, based on the document size and resolution and the FBSE received from the counter, the host computer sets up read pointers for accessing the buffer memory 200 on the host interface board 30. If, for example, the user has selected to scan a 36" document at 200 dpi, the initial read pointer for the left half of the scan line would be set to zero (0) and the initial read pointer for the right half of the scan line would be set to 450. That is, referring back to FIG. 3, each half of the scan line (A1 and A2) will occupy 450 consecutive bytes of memory and the entire block for the scan line will occupy 900 bytes. If the stitch error is two, however, the read pointer for the right half of the scan line will be advanced another 1800 bytes (2 × 900) from the read pointer for the left half of the scan line. In practice, the difference between the two read pointers will be slightly greater for the example given because of padding at the beginning and the end of the scan line. The example is therefore meant to be illustrative only.

Finally, in step 310, the host computer sends a command over the serial interface to the microprocessor 100 on the digital board 20 to initiate the scan.

In the first step 312 of FIG. 8B, after initializing the scan, the host computer waits until it receives a line interrupt from the host interface board 30 indicating that a scan line has been received in the memory buffer 200. The host computer then reads the line count from the line counter 260 on the host interface board 30 to determine how many scan lines are stored in the buffer memory 200. If the number of scan lines is greater than the front-back stitch error (FBSE) in step 316, then the host computer can read the scan line out of the buffer memory in step 318 using the read pointers. If the number of scan lines is insufficient to obtain a stitched line, then control returns to the beginning to wait for another scan line.

In reading the scan line in step 316, the host computer reads two separate blocks of data beginning at each of the read pointers to produce a single stitched scan line. At the end of the scan line, in step 320, the read pointers must therefore be incremented by the full line width to point to the data for the next scan line. Following the previous example, each of the read pointers must be incremented by 900 at the end of each scan line to skip to the next scan line.

In step 322, the scan line is stored in the host computer memory, on a disk, such as disk 50 shown in FIG. 4 or other device used for storing the image, or may be displayed simultaneously on a CRT or other display device. Finally, in step 324, the host computer must decrement by one the line counter 260 on the host interface board 30 indicating that a line was read from the buffer memory 200.

Figure 9A:
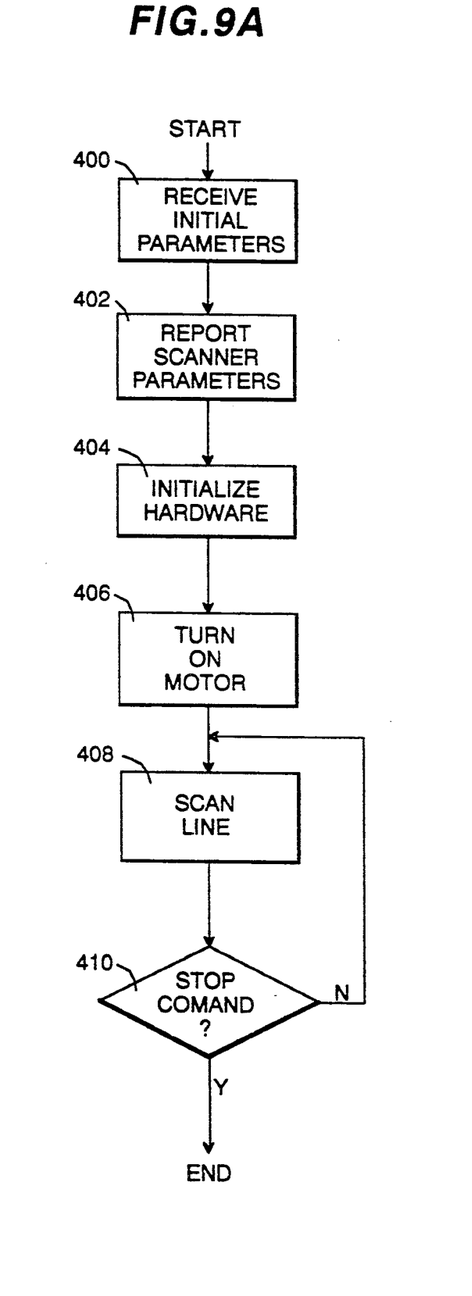
FIGS. 9A and 9B are flow diagrams of the steps performed by scanner firmware in the digital board microprocessor for producing a single scan line from two CCD arrays.
Figure 9B:
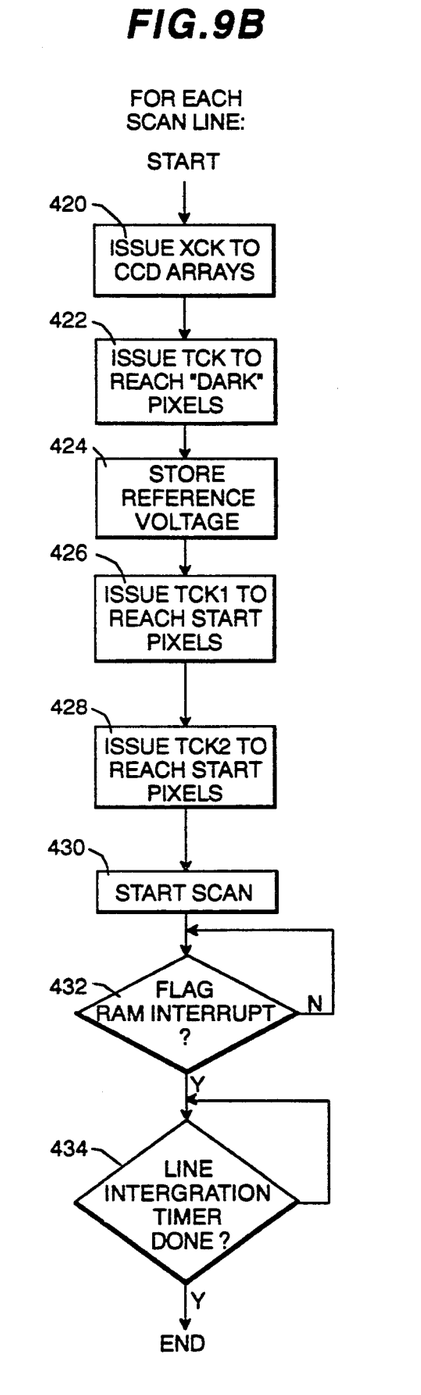

FIGS. 9A and 9B show the steps executed by microprocessor 100 on the digital board 20 in order to scan a document. In the first step 400, the microprocessor receives the initial parameters from the host computer over the serial interface, including the document width and the resolution. In return, the microprocessor reads the front-back stitch error (FBSE) from the nonvolatile RAM 120 and reports this value back to the host computer over the serial interface in step 402.

In step 404, the microprocessor initializes hardware on the digital board for performing the scan. Specifically, the microprocessor initializes the flag RAM 140 based on the document size, sets up the state machine 190 depending on the resolution, and resets the address counter 160. The normalization data in the normalization RAM will have been previously loaded as part of another procedure initiated by the host computer when the scanner is turned on.

In step 406, the microprocessor loads and starts the programmable timer 130 to turn on the stepper motor and begin to feed the document into the scanner.

The microprocessor will then initiate line scans in step 408 at appropriate intervals based on the stepper motor speed and an integration time set also set in programmable timer 130 until a stop command is received over the serial interface from the host computer in step 410.

Steps 420-430 in FIG. 9B further illustrate the steps performed by the microprocessor under firmware control in scanning a line in step 408 of FIG. 9A. Specifically, for each scan line, the microprocessor in step 420 will first issue a transfer clock (XCK) to the CCD arrays to transfer the image information from the photosites of the CCDs to the shift register on the CCD array. Then, in step 422, an appropriate number of transport clocks (TCK) are issued to each array in order to reach the special "dark-reference" pixels on each array. In step 424, the reference voltage from each array is strobed into the sample and hold circuits on the analog board 10 so that the DC bias can be removed from the video image signals.

In steps 426 and 428, the microprocessor issues an appropriate number of transport clocks (TCK1 and TCK2) to each CCD array in order to reach the start pixel of each CCD array. The start pixel for each array will be calculated from the left-right stitch error (LRSE) stored in the nonvolatile RAM 120 as described above.

In step 430, the microprocessor will send appropriate control signals to the address counter 160 and the state machine 190 to begin a scan. The scan will proceed under hardware control as previously described in connection with the digital board hardware.

At the end of each scan, the flag RAM bit 2 will generate an interrupt to the microprocessor to indicate that the scan line transfer is complete. Thus, when the flag RAM interrupt is received by the microprocessor in step 432, the scan line is complete.

In step 434, the microprocessor then waits for the line integration timer to indicate when to start the next scan line.

Automatic Calibration of Left-Right and Front-Back Stitch Errors

The left-right stitch error (LRSE) and front-back stitch error (FBSE) may be determined by trial and error by viewing the document on a CRT display of the host computer as it is scanned. While the document is being scanned, the user can, for example, initiate a command from the host computer to the microprocessor on the digital board through the serial interface to either increment or decrement the left-right stitch error (LRSE) stored in the nonvolatile RAM 120. Likewise, the user can dynamically change the front-back stitch error (FBSE) through appropriate software commands executing on the host computer which will change the read pointers to the buffer memory and also send a command via the serial interface to the microprocessor on the digital board to either increment or decrement the front-back stitch error (FBSE) stored in the nonvolatile RAM.

Figure 10:
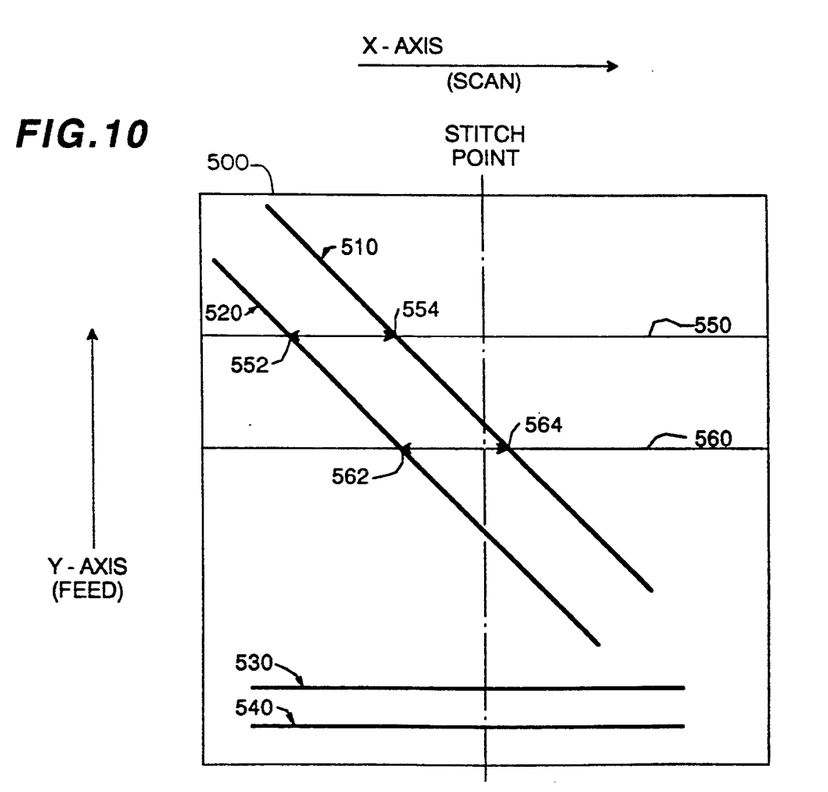
FIG. 10 shows a stitch target suitable for automatic calibration of left-right and front-back stitch errors.

In addition, the scanner apparatus and scanner system software on the host computer may be used to automatically measure the left-right stitch error (LRSE) and the front-back stitch error (FBSE) using an appropriate stitch target fed into the scanner. FIG. 10 shows one such example of an appropriate stitch target 500. The target has two sets of parallel lines 510/520 and 530/540 having a uniform thickness for calculating the left-right and front-back stitch errors, respectively.

In order to calculate the left-right stitch error (LRSE), the target is inserted into the scanner with the target center aligned approximately with the stitch point. At an appropriate point in the document scan, the two parallel lines 510/520 will be imaged by only one of the CCD arrays. Since a single CCD has no stitch error, the CCD can be effectively used to measure the actual distance between two lines. This method serves to self-calibrate the target. To do so, however, it is assumed that the CCD camera magnification is accurate.

Looking at a scan along line 550 as shown in FIG. 10, the distance between parallel lines 510/520 can be determined by counting the white pixels between the black pixels at points 552 and 554 on the parallel lines. In practice, the lines will also have some thickness so that a half thickness of each line must be added to the white distance between the lines in order to obtain the distance between their centers and reduce the effect of threshold sensitivity.

For example, if the two target lines are ¼" apart, then a measurement from points 552 and 554 along scan line 550 might be something like this:

4 Black—86 white—4 black

This indicates that the line thickness is 4 pixels and the distance between the center of each line is 90 pixels. Now with the target over the stitch point, such as along scan line 560 shown in FIG. 10, the measurement between points 562 and 654 might be something like this:

4black—83 white—4 black

This indicates that the images received from the CCD arrays are too far apart and that the left-right stitch error (LRSE) should be decreased by three (3).

Similarly, the scanner system software can measure the front-back stitch error (FBSE) by scanning a target with horizontal lines such as lines 530/540 shown in FIG. 10. From the image data, the system software can determine when a given target line such as line 530 is "seen" by the last active pixel of CCD array 1 and the first active pixel of CCD array 2. The number of scan lines between the time when one CCD array first images the line until the next CCD array images the same line can then be used to adjust the front back stitch error (FBSE). This method assumes that the document feed is stable and accurate. The scanner digital board maintains synchronization between the line integration timer and motor clock timing to help assure accuracy.

It will be apparent to those skilled in the art that various modifications and variations can be made in scanning apparatus and related scanning method without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for scanning an image line by line to produce data representative of the image comprising:

a plurality of linear arrays, each of the arrays having a plurality of photosensitive pixel elements arranged in succession along a linear axis of the array;

means for moving the image relative to the arrays;

means for supporting the arrays in position to scan the image with the linear axis of the arrays extending substantially perpendicular to the direction of movement of the image relative to the arrays;

means for determining a starting pixel element for each array;

means for reading video image data from each of the arrays beginning at the starting pixel element for each array and ending a predetermined number of pixel elements after the starting pixel element, said reading means comprising:

means for providing to each of the arrays a number of clock pulses corresponding to the starting pixel element for each array in order to reach the video image data, memory means for storing in sequential memory locations flag data corresponding to the predetermined number of pixel elements for each array, counter means for sequentially addressing the memory means, means for providing clock pulses to each of the arrays in response to the flag data read from the memory to transport the video image data out of the arrays; and means for forming a composite scan line of data representative of a single line of the image from the video image data read from each of the arrays.

2. The apparatus according to claim 1, wherein each array has a field of view that is less than the width of the image and the field of view of each array overlaps with the field of view of one of the other arrays, and wherein the means for determining a starting pixel element includes means for determining an error value corresponding to the degree of overlap between the arrays.

3. The apparatus according to claim 1, further comprising a host computer for displaying the composite scan lines of data representative of the image on a display device while the image is being scanned; and means for changing the starting pixel element for each array while the image is being scanned.

4. An apparatus for scanning an image line by line to produce data representative of the image comprising:

a plurality of linear arrays, each of the arrays having a plurality of photosensitive pixel elements arranged in succession along a linear axis of the array;

means for moving the image relative to the arrays;

means for supporting the arrays in position to scan the image with the linear axis of the arrays extending substantially perpendicular to the direction of movement of the image relative to the arrays;

means for reading video image data from each of the arrays;

means for forming scan lines of data from the video image data read from each of the arrays;

memory buffer means for storing the scan lines of data in sequential memory locations;

means for determining starting read pointers corresponding to each array for reading from the memory buffer means separate portions of the scan lines of data corresponding to the video image data read from each of the arrays; and means for reading from the memory buffer means the separate portions of the scan lines of data to form a composite scan line of data representative of a single line of the image.

5. The apparatus according to claim 4, further comprising means for displaying by a host computer the composite scan lines of data representative of the image on a display device while the image is being scanned; and means for changing the starting read pointers corresponding to each array while the image is being scanned.

6. An apparatus for scanning an image line by line to produce data representative of the image comprising: 'a plurality of linear arrays, each of the arrays having a plurality of photosensitive pixel elements arranged in succession along a linear axis of the array;

means for moving the image relative to the arrays;

means for supporting the arrays in position to scan the image with the linear axis of the arrays extending substantially perpendicular to the direction of movement of the image relative to the arrays;

means for determining a starting pixel element for each array;

means for reading video image data from each of the arrays beginning at the starting pixel element for each array and ending a predetermined number of pixel elements after the starting pixel element;

means for forming scan lines of data from the video image data read from each of the arrays;

memory buffer means for storing the scan lines of data in sequential memory locations;

means for determining starting read pointers corresponding to each array for reading from the memory buffer means separate portions of the scan lines of data corresponding to the video image data read from each of the arrays; and means for reading from the memory buffer means the separate portions of the scan lines of data to form a composite scan line of data representative of a single line of the image.

7. The apparatus according to claim 6, wherein each array has a field of view that is less than the width of the image and the field of view of each array overlaps with the field of view of one of the other arrays, and wherein the means for determining a starting pixel element includes means for determining an error value corresponding to the degree of overlap between the arrays.

8. The apparatus according to claim 6, further comprising means for displaying by a host computer the composite scan lines of data representative of the image on a display device while the image is being scanned;

first means for changing the starting pixel element for each array while the image is being scanned; and second means for changing the starting read pointers corresponding to each array while the image is being scanned.

9. The apparatus of claim 6, wherein the means for reading video image data comprises:

means for providing to each of the arrays a number of clock pulses corresponding to the starting pixel element for each array in order to reach the video image data;

memory means for storing in sequential memory locations flag data corresponding to the predetermined number of pixel elements for each array;

counter means for sequentially addressing the memory means; and means for providing clock pulses to each of the arrays in response to the flag data read from the memory to transport the video image data out to the arrays.

10. In an apparatus for scanning an image line by line to produce data representative of the image, the apparatus including a plurality of linear arrays, each of the arrays having a plurality of photosensitive pixel elements arranged in succession along a linear axis of the array, wherein the image moves relative to the arrays, and wherein the arrays are supported in position to scan the image with the linear axis of the arrays extending substantially perpendicular to the direction of movement of the image relative to the arrays, a method of forming a composite scan line of data representative of a single line of the image comprising the steps of:

determining a starting pixel element for each array;

reading video image data from each of the arrays beginning at the starting pixel element for each array and ending a predetermined number of pixel elements after the starting pixel element;

providing to each of the arrays a number of clock pulses corresponding to the starting pixel element for each array in order to reach the video image data;

sequentially addressing a random access memory in which flag data corresponding to the predetermined number of pixel elements for each array has been stored in sequential memory locations;

providing clock pulses to each of the arrays in response to the flag data read from the memory to transport the video image data out of the arrays; and forming the composite scan line of data from the video image data read from each of the arrays.

11. The method according to claim 10, wherein each array has a field of view that is less than the width of the image and the field of view of each array overlaps with the field of view of one of the other arrays, and wherein the step of determining a starting pixel element for each array includes the substep of determining an error value corresponding to the degree of overlap between the arrays.

12. The method according to claim 11, further comprising the steps of displaying by a host computer the composite scan lines of data representative of the image on a display device while the image is being scanned; and changing the starting pixel element for each array while the image is being scanned.

13. In an apparatus for scanning an image line by line to produce data representative of the image, the apparatus including a plurality of linear arrays, each of the arrays having a plurality of photosensitive pixel elements arranged in succession along a linear axis of the array, wherein the image moves relative to the arrays, and wherein the arrays are supported in position to scan the image with the linear axis of the arrays extending substantially perpendicular to the direction of movement of the image relative to the arrays, a method of forming a composite scan line of data representative of a single line of the image comprising the steps of:

reading video image data from each of the arrays;

forming scan lines of data from the video image data read from each of the arrays;

storing the scan lines of data in sequential memory locations in a memory buffer;

determining starting read pointers corresponding to each array for reading from the memory buffer separate portions of the scan lines of data corresponding to the video image data read from each of the arrays; and reading from the memory buffer the separate portions of the scan lines of data to form the composite scan line of data.

14. The method according to claim 13, further comprising the steps of displaying by a host computer the composite scan lines of data representative of the image on a display device while the image is being scanned; and changing the starting read pointers corresponding to each array while the image is being scanned.

15. In an apparatus for scanning an image line by line to produce data representative of the image, the apparatus including a plurality of linear arrays, each of the arrays having a plurality of photosensitive pixel elements arranged in succession along a linear axis of the array, wherein the image moves relative to the arrays, and wherein the arrays are supported in position to scan the image with the linear axis of the arrays extending substantially perpendicular to the direction of movement of the image relative to the arrays, a method of forming a composite scan line of data representative of a single line of the image comprising the steps of:

determining a starting pixel element for each array;

reading video image data from each of the arrays beginning at the starting pixel element for each array and ending a predetermined number of pixel elements after the starting pixel element; and forming scan lines of data from the video image data read from each of the arrays;

storing the scan lines of data in sequential memory locations in a memory buffer;

determining starting read pointers corresponding to each array for reading from the memory buffer separate portions of the scan lines of data corresponding to the video image data read from each of the arrays; and reading from the memory buffer the separate portions of the scan lines of data to form the composite scan line of data.

16. The method according to claim 15, wherein each array has a field of view that is less than the width of the image and the field of view of each array overlaps with the field of view of one of the other arrays, and wherein the step of determining a starting pixel element for each array includes the substep of determining an error value corresponding to the degree of overlap between the arrays.

17. The method according to claim 15, further comprising the steps of displaying by a host computer the composite scan lines of data representative of the image on a display device while the image is being scanned; and changing the starting pixel element for each array while the image is being scanned.

18. The method according to claim 15, further comprising the steps of displaying by a host computer the composite scan lines of data representative of the image on a display device while the image is being scanned; and changing the starting read pointers corresponding to each array while the image is being scanned.

19. The method according to claim 15, wherein the step of reading video image data includes the substeps of:

providing to each of the arrays a number of clock pulses corresponding to the staring pixel element of each array in order to reach the video image data;

sequentially addressing a random access memory in which flag data corresponding to the predetermined number of pixel elements for each array has been stored in sequential memory locations; and providing clock pulses to each of the arrays in response to the flag data read from the memory to transport the video image data out of the arrays.

20. An apparatus for scanning an image line by line to produce data representative of the image comprising:

a plurality of linear arrays, each of the arrays having a plurality of photosensitive pixel elements arranged in succession along a linear axis of the array;

means for moving the image relative to the arrays;

means for supporting the arrays in position to scan the image with the linear axis of the arrays extending substantially perpendicular to the direction of movement of the image relative to the arrays;

optical calibration means for providing a target image to the arrays;

means for reading video image data from each of the arrays;

means for automatically determining an error value from video image data corresponding to the target image for correcting a stitch error due to physical positioning of the arrays relative to each other, wherein the error value corresponds to an offset between the arrays in the direction of movement of the image; and means for forming scan lines of data from the video image data read from each of the arrays.

21. The apparatus of claim 20, further comprising:

memory buffer means for storing the scan lines of data from the video image data read from each of the arrays;

means for determining from the error value starting read pointers corresponding to each array for reading from the memory buffer means separate portion of the scan lines of data corresponding to the video image data read from each of the arrays; and means for reading from the memory buffer means the separate portions of the scan lines of data to form a composite scan line of data representative of a single line of the image.

22. The apparatus of claim 20, wherein the optical calibration means includes a stitch target that is fed into the apparatus by an operator.

23. The apparatus of claim 22, wherein the stitch target includes an image having two parallel lines.

24. In an apparatus for scanning an image line by line to produce data representative of the image, the apparatus including a plurality of linear arrays, each of the arrays having a plurality of photosensitive pixel elements arranged in succession along a linear axis of the array, wherein the image moves relative to the arrays, and wherein the arrays are supported in position to scan the image with the linear axis of the arrays extending substantially perpendicular to the direction of movement of the image relative to the arrays, a method of forming a composite scan line of data representative of a single line of the image comprising the steps of:

providing a target image to the arrays;

reading video image data from each of the arrays;

automatically determining an error value from video image data corresponding to the target image for correcting a stitch error due to physical positioning of the arrays relative to each other, wherein the error value corresponds to an offset between the arrays in the direction of movement of the image; and forming scan lines of data from the video image data read from each of the arrays.

25. The method of claim 24, further comprising the steps of:

storing the scan lines of data in sequential memory locations in a memory buffer;

determining from the error value starting read pointers corresponding to each array for reading from the memory buffer means separate portion of the scan lines of data corresponding to the video image data read from each of the arrays; and reading from the memory buffer the separate portions of the scan lines of data to form a composite scan line of data.

26. The method of claim 24, wherein the target image is fed into the apparatus by an operator.

27. The method of claim 24, wherein the target image includes an image having two parallel lines.

* * * * *